(12) United States Patent
Huberland

(10) Patent No.: US 7,727,312 B2
(45) Date of Patent: Jun. 1, 2010

(54) DEVICE FOR DRYING COMPRESSED GAS

(75) Inventor: Filip Gustaaf M. Huberland, Duffel (BE)

(73) Assignee: Atlas Copco Airpower, Naamloze Vennootschap, Wilrijk (BE)

(*) Notice: Subject to any disclaimer, the term of this patent is extended or adjusted under 35 U.S.C. 154(b) by 264 days.

(21) Appl. No.: 11/991,933

(22) PCT Filed: Sep. 14, 2006

(86) PCT No.: PCT/BE2006/000100

§ 371 (c)(1),
(2), (4) Date: Mar. 13, 2008

(87) PCT Pub. No.: WO2007/033440

PCT Pub. Date: Mar. 29, 2007

(65) Prior Publication Data

US 2009/0038479 A1 Feb. 12, 2009

(30) Foreign Application Priority Data

Sep. 22, 2005 (BE) .................................. 2005/0460

(51) Int. Cl.
*B01D 53/26* (2006.01)
(52) U.S. Cl. ...................... 96/126; 96/130; 55/DIG. 17

(58) Field of Classification Search .................... 96/121, 96/126–128, 130, 133; 55/DIG. 17; 34/80
See application file for complete search history.

(56) References Cited

U.S. PATENT DOCUMENTS

| | | | | |
|---|---|---|---|---|
| 5,090,973 | A * | 2/1992 | Jain | 95/99 |
| 5,213,593 | A * | 5/1993 | White, Jr. | 95/99 |
| 5,681,370 | A * | 10/1997 | McMahon | 95/105 |
| 6,171,377 | B1 | 1/2001 | Henderson | |
| 6,375,722 | B1 | 4/2002 | Henderson et al. | |
| 6,723,155 | B2 * | 4/2004 | Weyrich et al. | 95/120 |
| 2004/0045434 | A1 * | 3/2004 | Golden et al. | 95/96 |
| 2005/0016379 | A1 | 1/2005 | Moeller et al. | |

FOREIGN PATENT DOCUMENTS

WO   WO 03/035220 A1   5/2003

\* cited by examiner

*Primary Examiner*—Frank M Lawrence
(74) *Attorney, Agent, or Firm*—Bacon & Thomas, PLLC

(57) ABSTRACT

Device for drying a compressed gas in a non-dissipative manner, which mainly consists of a compressed gas supply (2), at least two pressure vessels (31, 32) with an input (33, 34) and an output (35, 36), and a take-off point (26), whereby the device (1) is additionally provided with a first distribution device (3) and a second distribution device (13) which is provided with one or several coolers (30) and whereby the device (1) can be controlled by means of nine or ten cut-off valves (7-12, 21, 22, 29, 38 and 40).

11 Claims, 15 Drawing Sheets

DEVICE FOR DRYING COMPRESSED GAS

BACKGROUND OF THE INVENTION

A. Field

The present invention concerns a device for drying a compressed gas.

B. Related Art and Summary

In particular, the invention concerns a device for drying compressed gas in a non-dissipative manner, in other words a device whereby the heat of the compression, present in the compressed gas, is used as a whole or partly to regenerate the desiccant, and whereby the entire supplied gas flow flows integrally through the device, without any part of this gas being blown off in the atmosphere or being fed back to the input of the device, which results in that such a device has a better efficiency than certain existing devices.

In particular, the invention concerns a device for drying a compressed gas in a non-dissipative manner, which mainly consists of a supply of compressed gas, for example in the shape of a compressed air compressor, at least two pressure vessels with an input and an output and a take-off point for compressed gas consumers.

Such devices are already known, whereby the above-mentioned pressure vessels are filled with a desiccant and whereby the gas to be dried is sent through a first regenerating pressure vessel so as to absorb moisture from the desiccant, by making use of the heat of said compressed gas, and to thus regenerate this desiccant, and whereby this gas is subsequently cooled by means of a cooler to be then guided through a second drying pressure vessel where this cooled gas is dried by the desiccant.

As soon as the desiccant in the drying pressure vessel is saturated, the flow-through sequence of the pressure vessels is reversed, such that the first pressure vessel becomes a drying vessel, whereas the second pressure vessel is turned into a regenerating pressure vessel.

Thus, thanks to the alternating use of the above-mentioned pressure vessels as a drying and regenerating pressure vessel, one pressure vessel will always be regenerated by the compressed gas, whereas the other pressure vessel makes sure that this compressed gas is subsequently dried.

The known devices for drying a compressed gas in a non-dissipative manner are disadvantageous in that they are provided with a large number of pipes and valves for reversing the pressure vessels as regenerating and drying pressure vessels, and in that they are very large and expensive and have a complex, non-modular design, such that a large number of variants need to be supported, which increases the development, production and maintenance costs.

In order to make the existing devices less complex, use is sometimes made of three-way and/or four-way valves, which are much more expensive and less reliable than conventional two-way valves, such that the operational reliability of the installation as a whole is strongly reduced.

An additional disadvantage for devices with a larger capacity for drying compressed gas is that it is often impossible, or at least economically inefficient to find 3-way or 4-way valves which meet the demands as far as required temperature, pressure and flow are concerned.

The present invention aims to offer a device for drying a compressed gas in a non-dissipative manner which does not have the above-mentioned and other disadvantages and which can be applied to different types of adsorption drying devices in a simple and cheap manner.

To this end, the present invention concerns a device of the above-mentioned type for drying a compressed gas in a non-dissipative manner, whereby this device is additionally provided with a first distribution device onto which the above-mentioned compressed gas supply and the take-off point are connected and which is moreover connected to each of the above-mentioned pressure vessels, and with a second distribution device which is provided with one or several coolers and which is connected to each of the respective inputs of the above-mentioned pressure vessels, whereby the above-mentioned first and second distribution device are connected to each other, and whereby the device can be controlled by means of nine or ten cut-off valves.

By cut-off valves are meant valves which can be controlled manually or in an automated manner, in other words which can be opened and closed. Non-return valves which cannot be controlled as such are consequently not regarded as cut-off valves as meant here.

A really major advantage of such a device according to the present invention is that it only has to be provided with a relatively limited number of valves compared to the existing devices for drying a compressed gas in a non-dissipative manner, as a result of which the device is cheaper and requires less maintenance costs.

If the above-mentioned valves are made in the form of automatically controlled valves, use can be made in this specific construction of a relatively simple control system with a limited number of inputs and outputs, and the control program is simplified as well in comparison with the known devices.

In a preferred embodiment of a device according to the invention, the above-mentioned first and second distribution devices are each built symmetrically and/or modularly.

By a symmetrical construction of the distribution devices is meant a functional symmetry in this case, and not so much a strictly geometric symmetry. This implies that the distribution devices can be made asymmetrical in shape, but that the device can be represented by means of a symmetrical functional diagram.

A major advantage of such a device according to the invention is that, thanks to the symmetrical construction, it contains a large number of common parts, such as for example pipes and pressure vessels, which can consequently be produced in larger numbers and thus in a cheaper manner.

Another advantage of a device according to the invention is that, thanks to the symmetrical construction, the above-mentioned distribution devices can be mounted one above the other, such that the length of the connecting lines between both distribution devices is reduced to a minimum, the device is reduced in size, and costs are saved.

Another advantage of a device according to the invention is that, thanks to the combination of the modular construction and the symmetrical arrangement of the distribution devices, one and the same distribution device can be combined with pressure vessels having different diameters. Since the diameter of the pressure vessels, as opposed to the diameter of the pipes in the distribution device, strongly depends on the flow rate to be dried, there are usually many more variants of the pressure vessels than there are variants of distribution devices.

Since, according to the invention, variants of distribution devices and pressure vessels are independently interchangeable, less different parts will need to be kept in stock and production costs can be saved.

DESCRIPTION OF THE DRAWINGS

In order to better explain the characteristics of the present invention, the following preferred embodiments of a device according to the invention for drying a compressed gas are given as an example only without being limitative in any way, with reference to the accompanying drawings, in which.

DETAILED DESCRIPTION OF PREFERRED EMBODIMENTS

Figure 1:
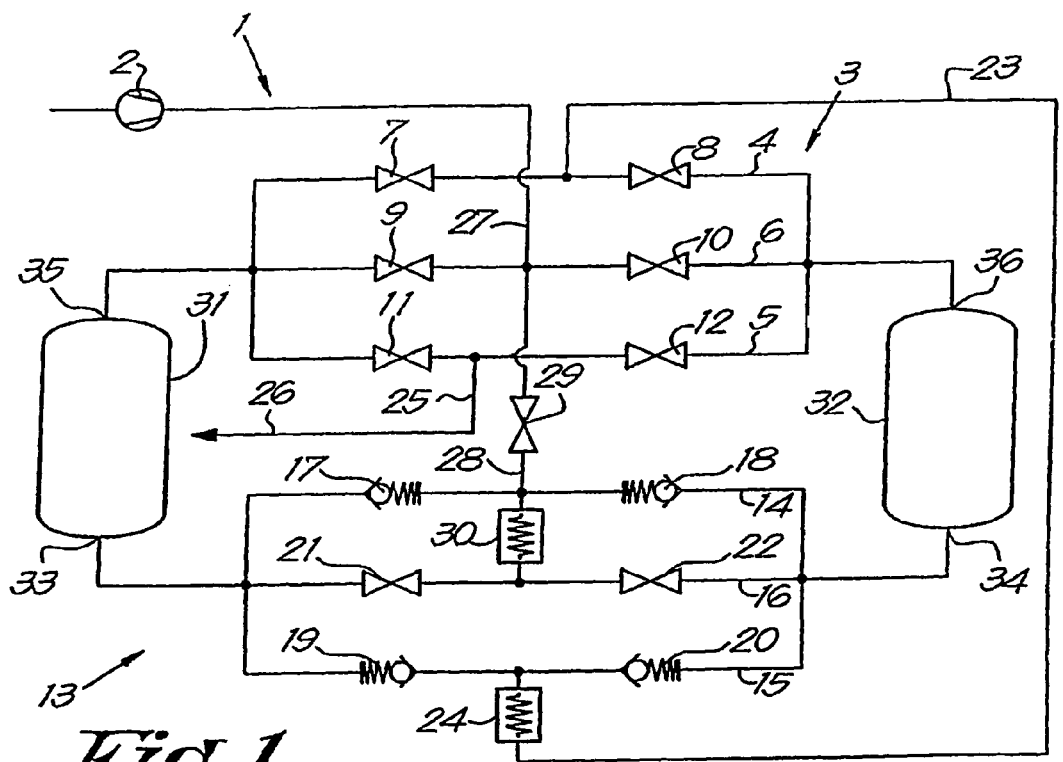
FIG. 1 schematically represents a device according to the invention.

FIG. 1 represents a device 1 according to the invention for drying a compressed gas in a non-dissipative manner which is provided with a compressed gas supply 2, which in this case is formed of a compressor and which is connected to a first distribution device 3.

The above-mentioned first distribution device 3 is in this case formed of three parallel pipes which are connected to each other, a first pipe 4, a second pipe 5 and a third pipe 6 respectively, in which are each time provided two valves 7-8, 11-12 and 9-10 which can be cut off, which in this case, but not necessarily, are made in the shape of controlled valves which are connected to a control system which is not represented in the figures.

Further, the device 1 comprises a second distribution device 13 which in this case has practically the same dimensions and geometry as the above-mentioned first distribution device 3 and which also mainly consists of three parallel pipes 14, 15 and 16 which are connected to each other, a first pipe 14 and a second pipe 15 respectively in which are each time provided two non-return valves 17-18, 19-20 respectively with an opposite flow direction, and a third pipe 16 with two valves 21 and 22 in it which can be cut off and which in this case, but not necessarily, are made in the form of controlled valves as well which are connected to the above-mentioned control system.

In the given example, the above-mentioned non-return valves 17 and 18 in the first pipe 14 of the second distribution device 13 are positioned such that they allow for a flow in the direction of one non-return valve to the other non-return valve in the pipe 14 concerned, and the above-mentioned non-return valves 19 and 20 in the second pipe 15 of the second distribution device 13 are positioned such that they allow for a flow in the direction away from the other non-return valve in the pipe 15 concerned.

It should be noted that the functional diagram in FIG. 1 of the above-mentioned first and second distribution device 3 and 13 is built up symmetrically. This symmetry can also be used in a practical embodiment, such as represented for example for the distribution devices 3 and 13 in FIGS. 6 to 8.

Between the valves 7 and 8 which can be cut off from the pipe 4 is connected a first branch 23 which provides a connection to the second distribution device 13 and which is connected in particular via a cooler 24 to the pipe 15, between the non-return valves 19 and 20.

In the pipe 5, between the valves 11 and 12 which can be cut off, is connected a second branch 25 which is connected to a take-off point 26 for a compressed gas consumer.

Between the valves 9 and 10 which can be cut off from the pipe 6 is provided a third branch 27 as a connection to the above-mentioned compressed gas supply 2 and a fourth branch 28 which is connected to the second distribution device 13 via a valve 29 which can be cut off, in particular between the non-return valves 17 and 18 in the pipe 14.

The pipes 14 and 16 are mutually connected between the above-mentioned valves 17-18 and 21-22 via a cooler 30.

Further, the device 1 for drying a compressed gas in a non-dissipative manner is also provided with two pressure vessels 31 and 32 which are filled with a desiccant, for example in the form of silica gel, and which are both provided with an input 33, 34 respectively and an output 35, 36 respectively.

It is clear that instead of silica gel as a desiccant, also other desiccants can be used.

The above-mentioned first distribution device 3 is connected to the outputs 35 and 36 of the pressure vessels 31 and 32 with the respective parallel connections between the pipes 4, 5 and 6, whereas the second distribution device 13 is connected to the inputs 33 and 34 of these pressure vessels 31 and 32 with the respective parallel connections between the pipes 14, 15 and 16.

According to the invention, the device 1 in this case has only nine valves 7 to 12, 21, 22 and 29 which can be cut off, which is less than with the known devices for drying compressed gas in a non-dissipative manner, so that, partly thanks to the symmetry, a simpler layout is obtained which is moreover less liable to wear and consequently requires less maintenance.

The working of a device 1 according to the invention for drying a compressed gas in a non-dissipative manner is very simple and is illustrated by means of FIGS. 2 to 5, whereby cut-off valves are represented in black when they are closed in these figures, whereas valves in their open position are represented in white and the flow of the gas is represented in bold.

Figure 2:
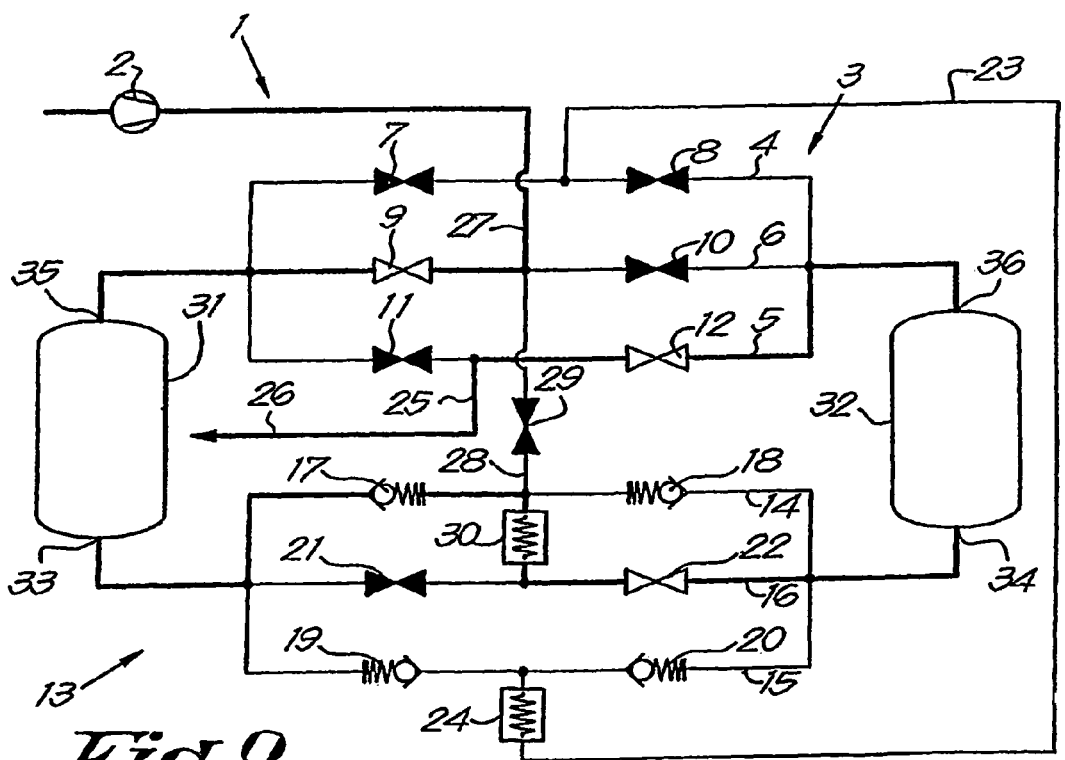
FIGS. 2 to 5 illustrate the working of a device according to FIG. 1.

In a first phase, which is represented in FIG. 2, the pressure vessel 31 is used to regenerate the desiccant which is present in this pressure vessel 31, and the pressure vessel 32 is used for drying gas coming from the supply 2.

To this end, the hot, compressed gas coming from the supply 2 is guided, via the open valve 9, through the first pressure vessel 31.

Moisture which is present in the desiccant in this first pressure vessel 31 is absorbed by the hot, compressed gas, such that the desiccant is regenerated in this first pressure vessel 31.

Next, the gas flow goes to the cooler 30 via the non-return valve 17, where it is cooled, and part of the moisture situated in the gas flow will condense to be then guided via the valve 22 through the second pressure vessel 32, where the gas is dried by the desiccant.

The output 36 of the second pressure vessel 32 is at that time connected via the valve 12 to the take-off point 26 onto which one or several dried compressed gas consumers are connected.

It is clear that the output coming from the supply 2 flows entirely and without any losses through both pressure vessels 25 to the take-off point 26.

Figure 3:
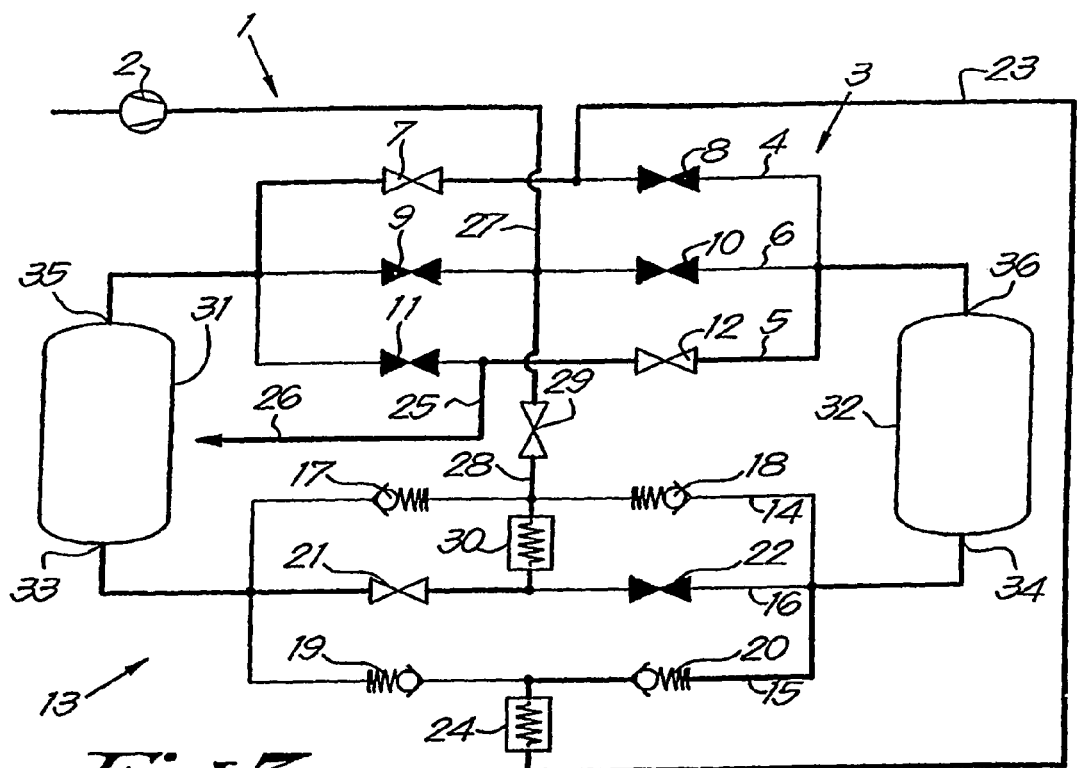

During a second phase, which is represented in FIG. 3, and which occurs at the end of the regeneration cycle of the desiccant in the regenerating pressure vessel 31, the entire output of compressed gas is successively guided via the valve 29 through the cooler 30 and via the valve 21 through the first pressure vessel 31, as a result of which this first, regenerating pressure vessel 31 is cooled.

Next, the gas flows via the valve 7 and the branch 23 through the cooler 24 and the non-return valve 20 to the second pressure vessel 32 where this gas is dried by the desiccant, after which it flows via the valve 12 and the branch 25 to the take-off point 26 for compressed gas consumers.

Figure 4:
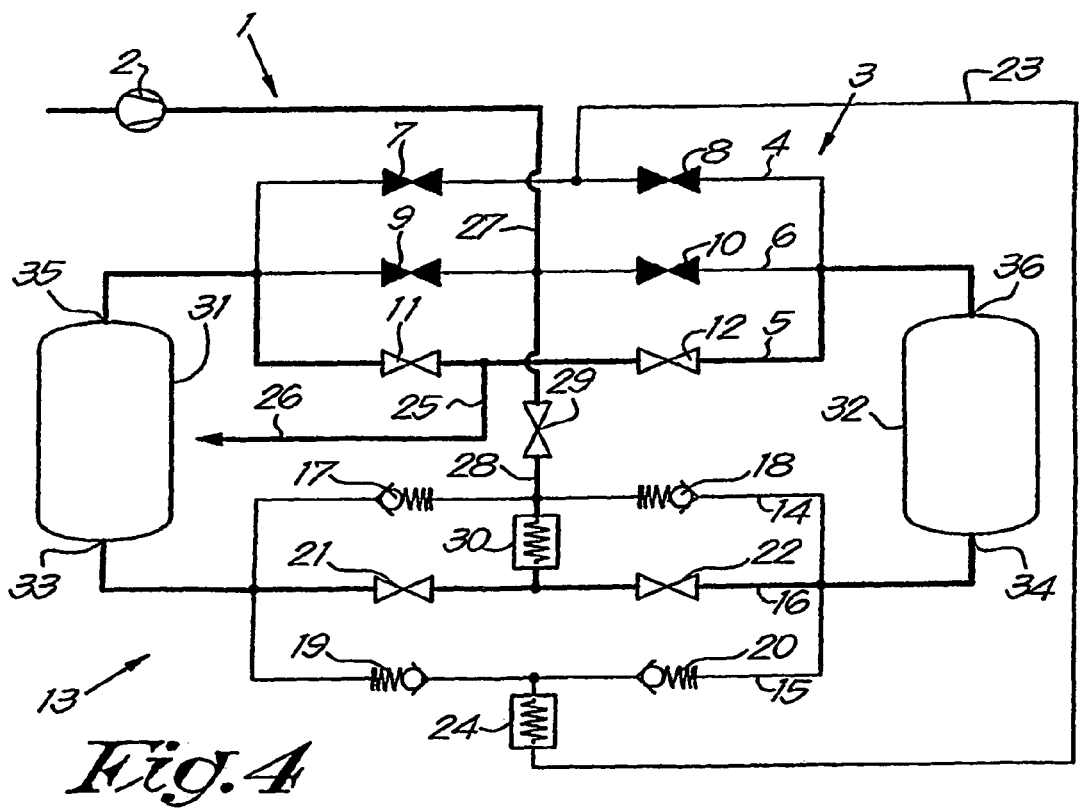

In a third, subsequent phase, when the desiccant in the drying pressure vessel 32 is almost saturated and/or the desiccant in the regenerated pressure vessel 31 is practically cooled, the compressed gas, as represented in FIG. 4, is divided for a short time span via the cooler 30 and via the valves 21 and 22 over both pressure vessels 31 and 32. The regenerated pressure vessel 31 is hereby cooled somewhat further, and the almost saturated pressure vessel 32 is somewhat relieved.

An advantage of cooling the desiccant in the regenerated pressure vessel 31 at the end of the regeneration cycle is that, at the time the pressure vessels 31 and 32 are changed over, whereby the regenerated pressure vessel 31 becomes a drying pressure vessel and vice versa, temperature and dew point peaks of the compressed gas at the take-off point 26 are avoided.

Figure 5:
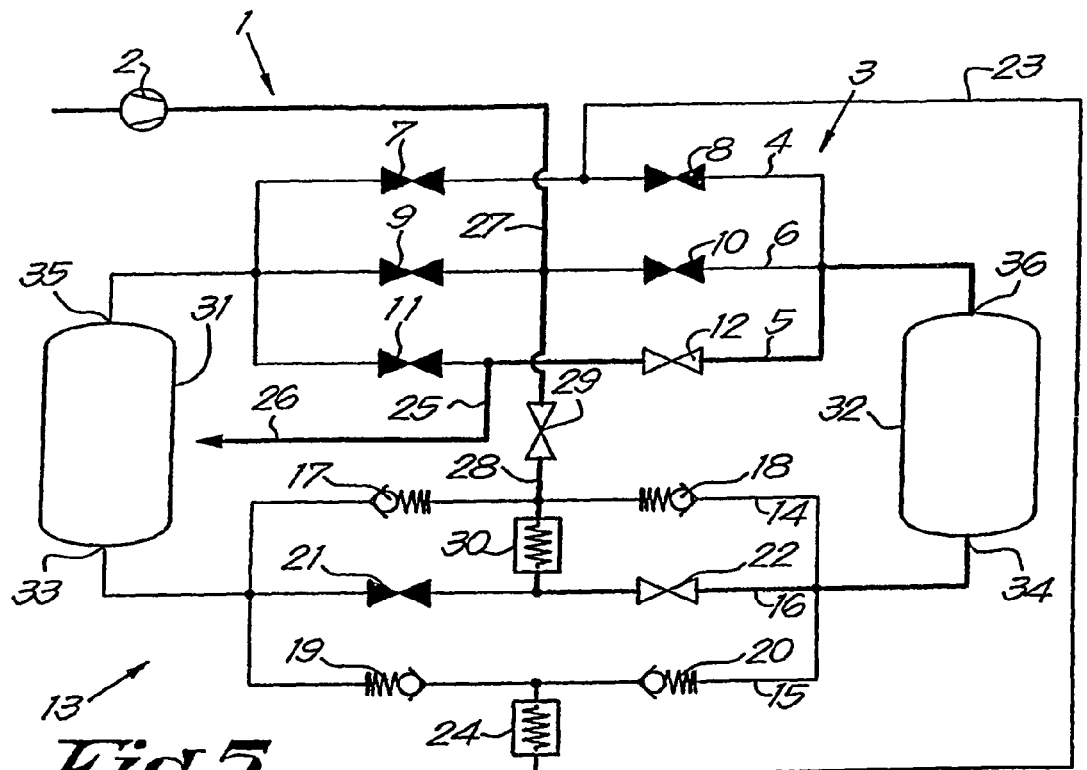

In a fourth and final phase, represented in FIG. 5, the entire output of the compressed gas is carried via the valve 29, the cooler 30 and the valve 22 through the practically saturated second pressure vessel 32, after which it is guided to the above-mentioned take-off point 26.

After this final phase there is a return to the first phase, but the pressure vessels 31 and 32 are hereby changed over and the first pressure vessel 31 then becomes the drying pressure vessel, whereas the second pressure vessel 32 will be regenerated, etc.

Since it is possible to dry in a non-dissipative manner with a device 1 according to the invention (save for a pressure drop of the gas between the inlet and the outlet), energy can be saved in comparison with devices whereby a part of the compressed gas is fed back or is blown off in the atmosphere.

In an embodiment of a device 1 according to the invention which is not represented in the figures, heating elements can be provided, either in the pressure vessels 31 and 32, or outside these pressure vessels 31 and 32, which heating elements are designed to better regenerate the desiccant, and to thus further reduce the dew point of the gas at the outlet of the device 1.

Figure 6:
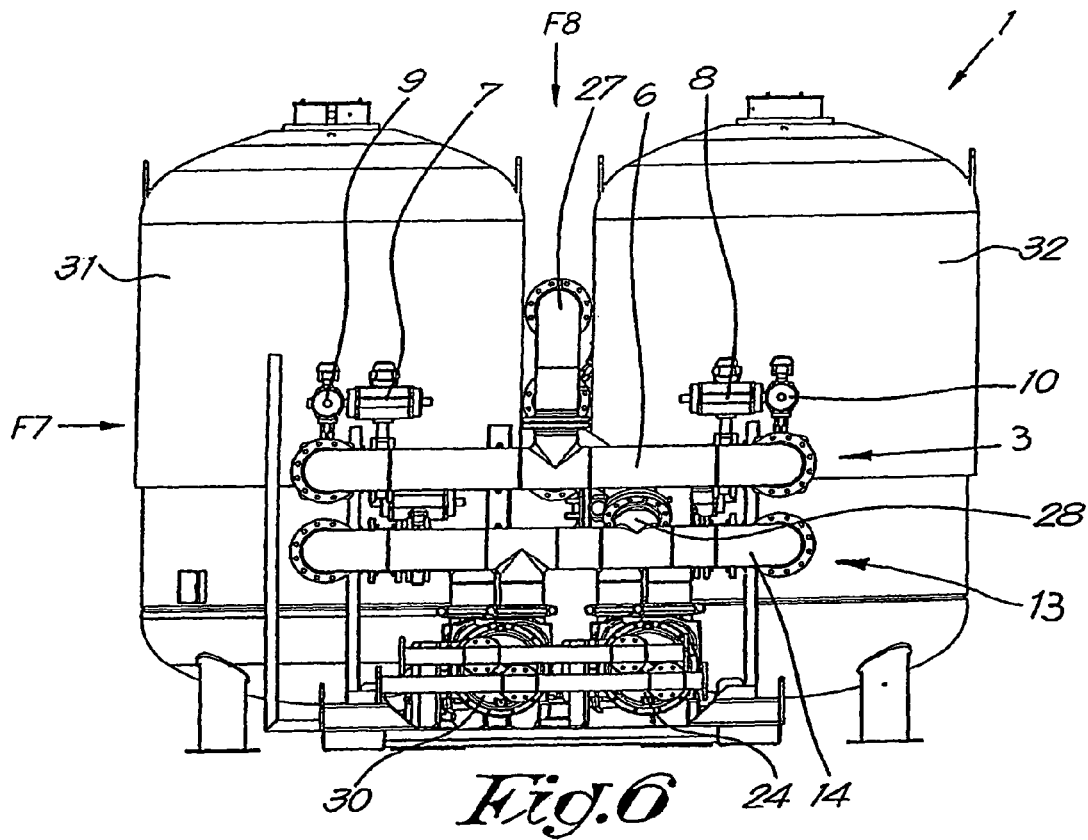
FIG. 6 represents a practical embodiment of the device according to FIG. 1.
Figure 7:
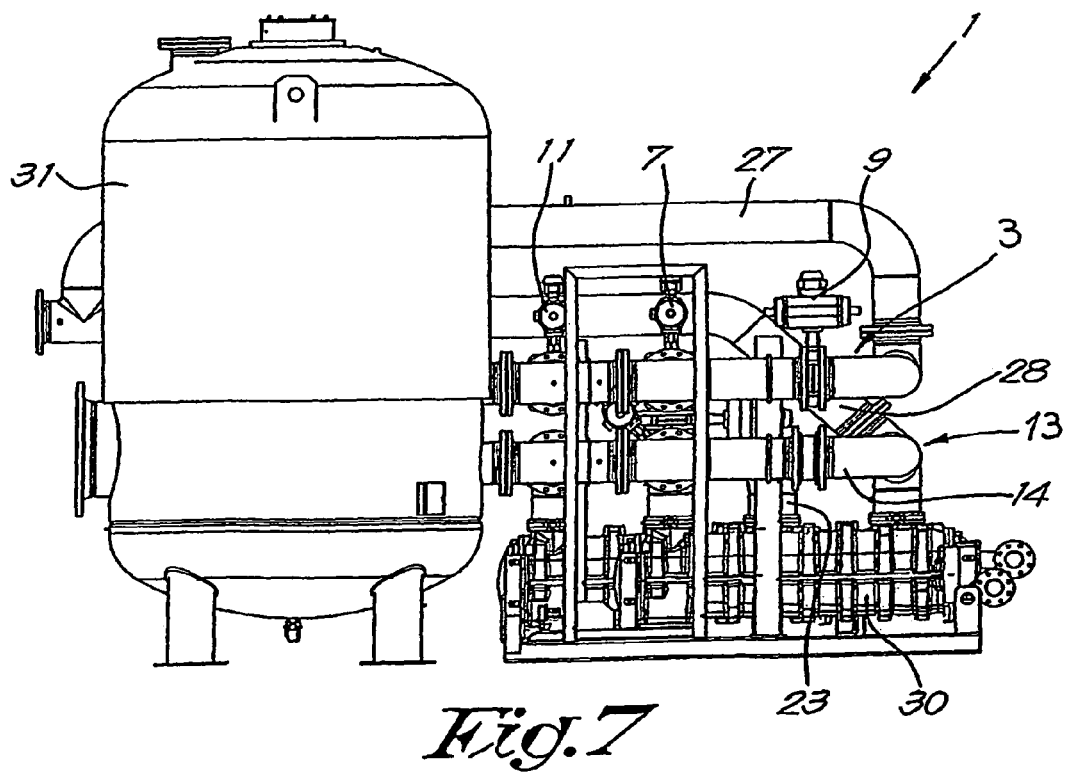
FIGS. 7 and 8 represent a view according to arrows F7 and F8 respectively in FIG. 6.
Figure 8:
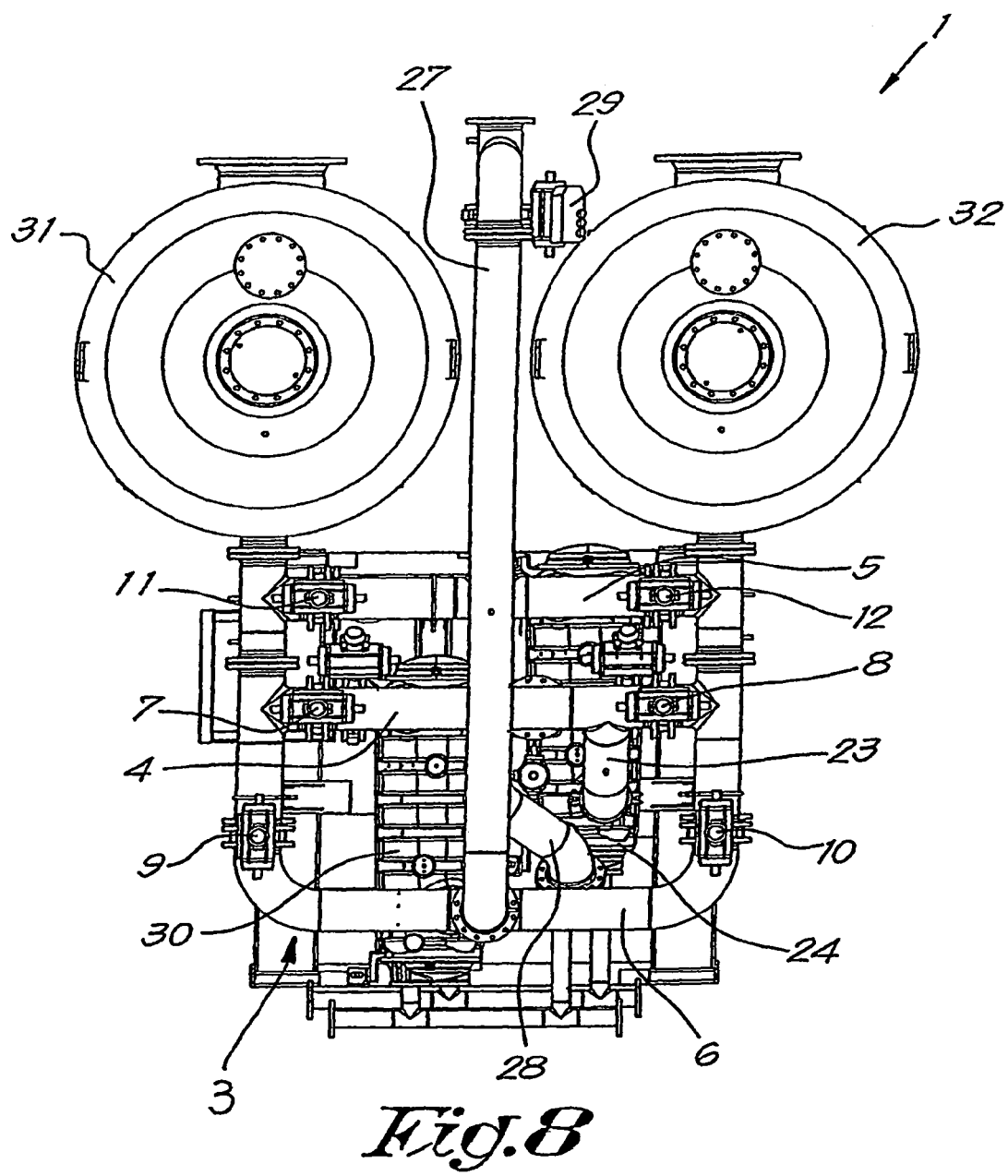

FIGS. 6 to 8 represent a practical embodiment of a device according to FIG. 1, whereby the first and second distribution device, 3 and 13 respectively, are made symmetrical by means of tubular constructions which are identical in shape and which are provided concentrically on top of each other.

In the given example, the above-mentioned tubular constructions are made according to standard dimensions, such that they can be combined with pressure vessels 31 and 32 having different volumes and for devices 1 having different capacities. Thus, the arrangement of the pressure vessels and tubular construction is modular, as a result of which the number of variants for the production is restricted and costs are saved.

In this case, the above-mentioned branches and connections can be realised in a simple manner by means of short pipes or lines provided between the tubular constructions situated on top of each other.

Figure 9:
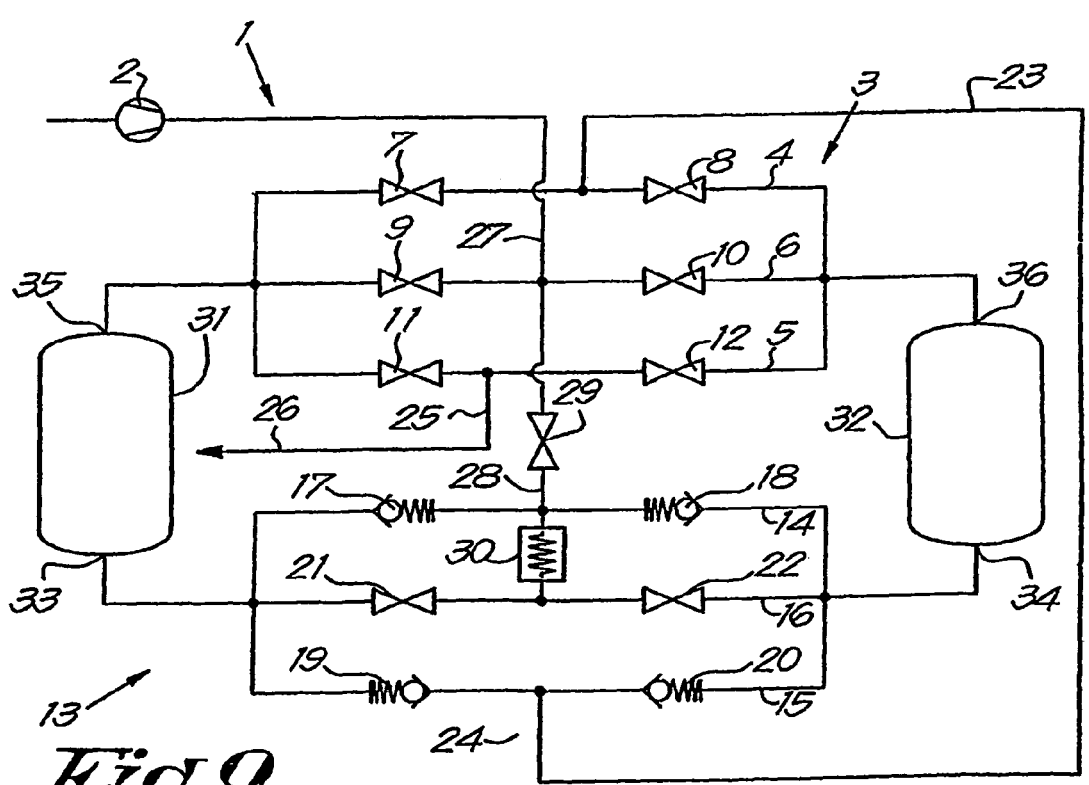
FIGS. 9, 14, 19 and 24 represent variants of a device according to FIG. 1.

FIG. 9 represents another embodiment of a device 1 according to the invention, whereby no cooler is provided in the above-mentioned first branch 23 of the first distribution device 3 in this case.

This will reduce the cost of the device even further, whereas it is nevertheless possible to obtain a good output with the device 1.

The working of this variant is practically analogous to that of the preceding embodiment.

Figure 10:
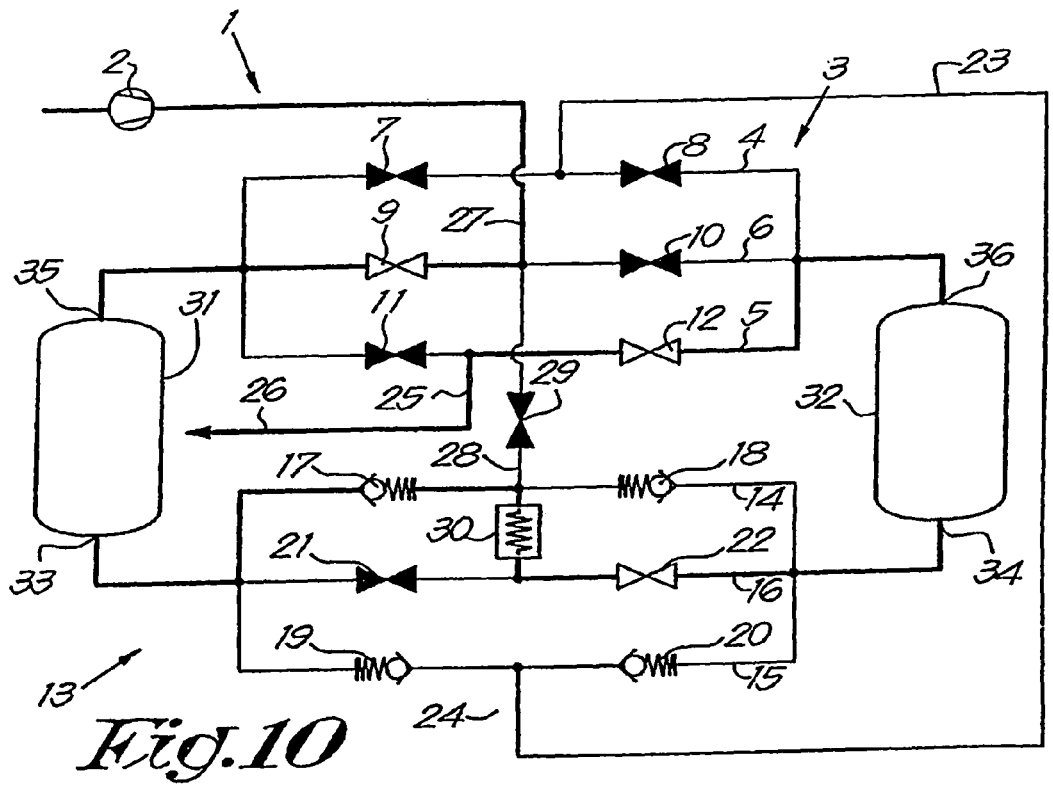
FIGS. 10 to 13, 15 to 18, 20 to 23 and 25 to 28 represent the working of a device according to FIGS. 9, 14, 19 and 24 respectively.
Figure 12:
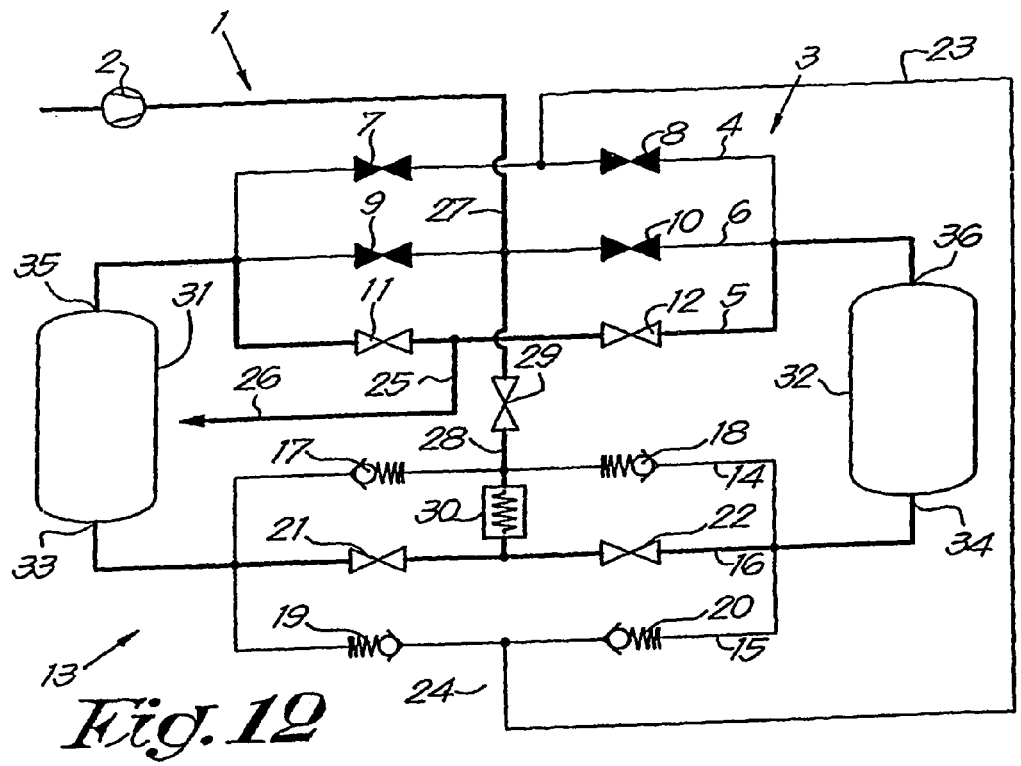
Figure 13:
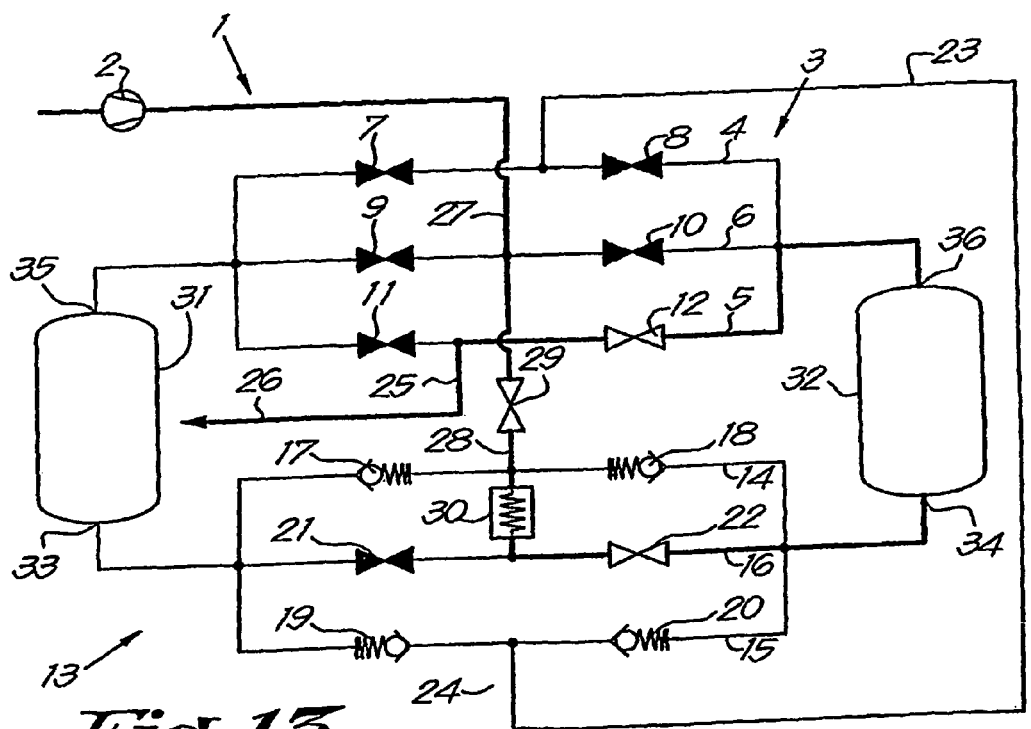

The first, third and fourth phases as represented in FIGS. 10, 12 and 13 respectively, are identical to the first, third and fourth phases of the preceding embodiment, as represented in FIGS. 2, 4 and 5 respectively.

Figure 11:
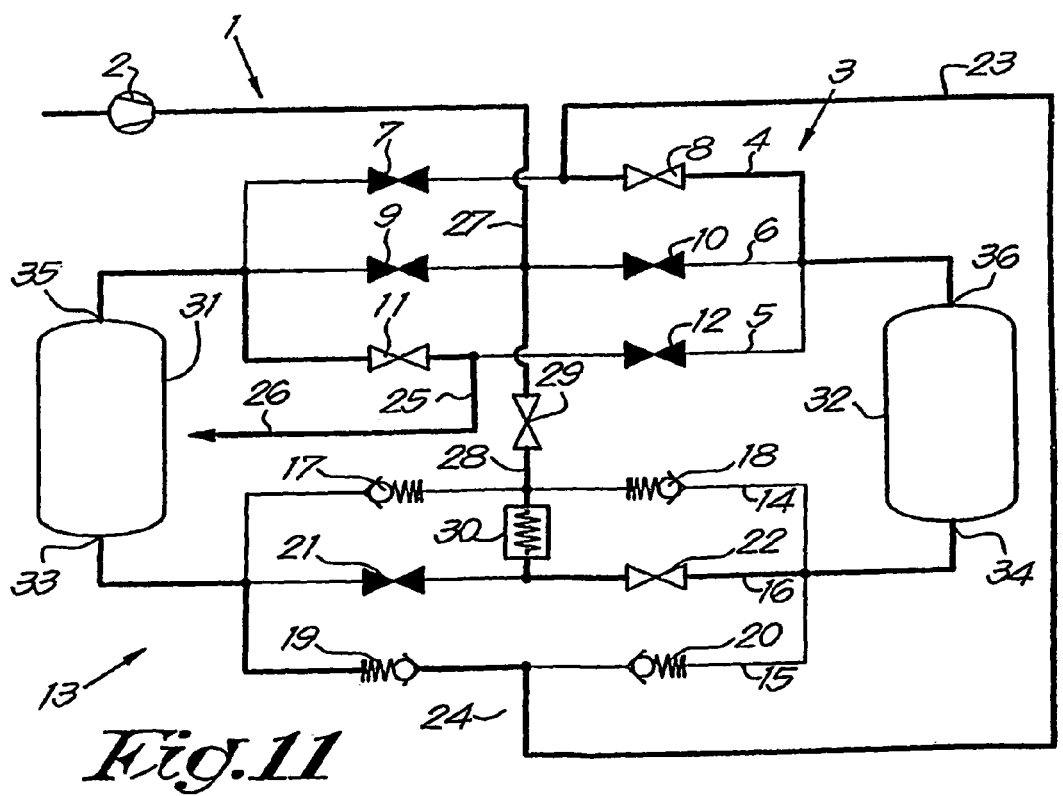

The second phase, which is represented in FIG. 11, is somewhat different in this embodiment from the one described above.

During this second phase, the entire output of gas to be dried is directed via the valve 29 through the cooler 30 in this case, after which this gas flows via the valve 22 to the input 34 of the second, drying pressure vessel 32 so as to be dried.

Next, the dried compressed gas flows via the valve 8 and through the first branch 23 of the first distribution device 3 to the pipe 15, where this gas flows via the non-return valve 19 to the regenerating pressure vessel 31 so as to then be carried via the branch 25 to the take-off point 26.

Since the compressed gas is cooled and dried first, before flowing through the regenerating pressure vessel 31, this gas will cool said regenerating pressure vessel 31.

Figure 14:
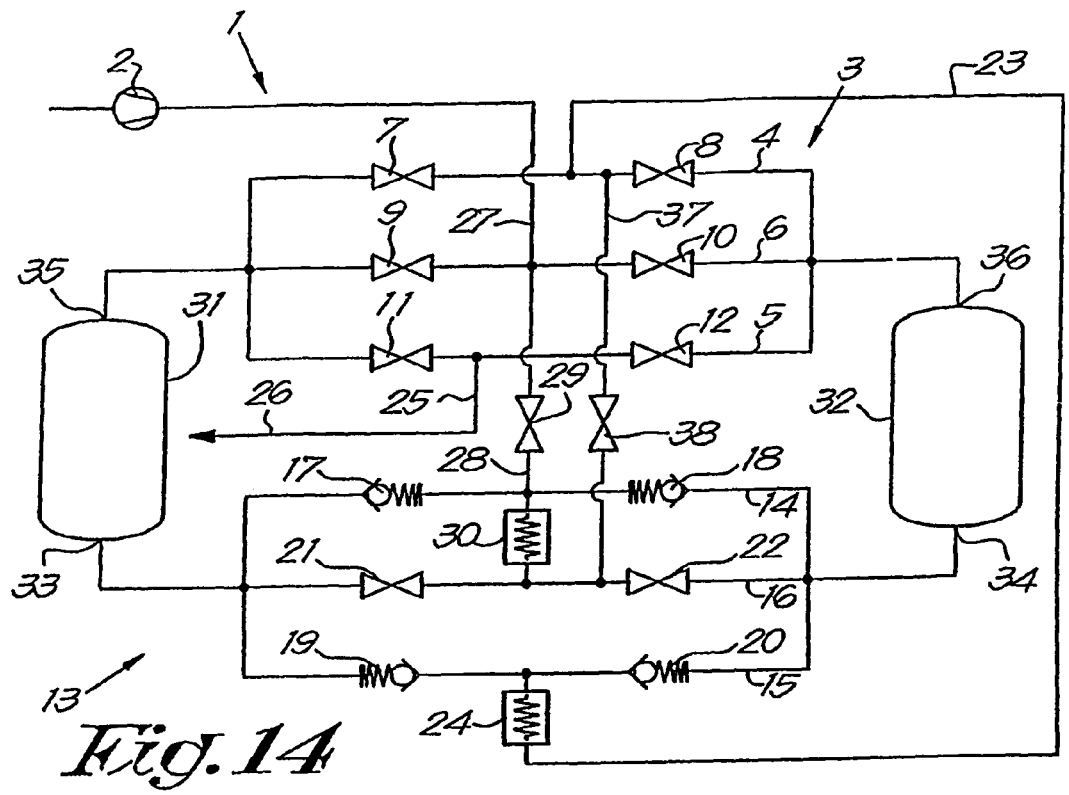

FIG. 14 represents yet another embodiment of a device 1 according to the invention for drying a compressed gas in a non-dissipative manner, whereby a connecting line 37 is provided between the valves 7 and 8 in the pipe 4 and between the valves 21 and 22 in the pipe 16, in which is provided a valve 38 which can be cut off.

In this case, the device 1 according to the invention is controlled by means of ten cut-off valves, which is considerably less than with known devices which make it possible to go through the same phases and to dry in a non-dissipative manner.

The working of such an embodiment according to FIG. 14 is practically analogous to that of the first embodiment and it is represented in FIGS. 15 to 18.

Figure 15:
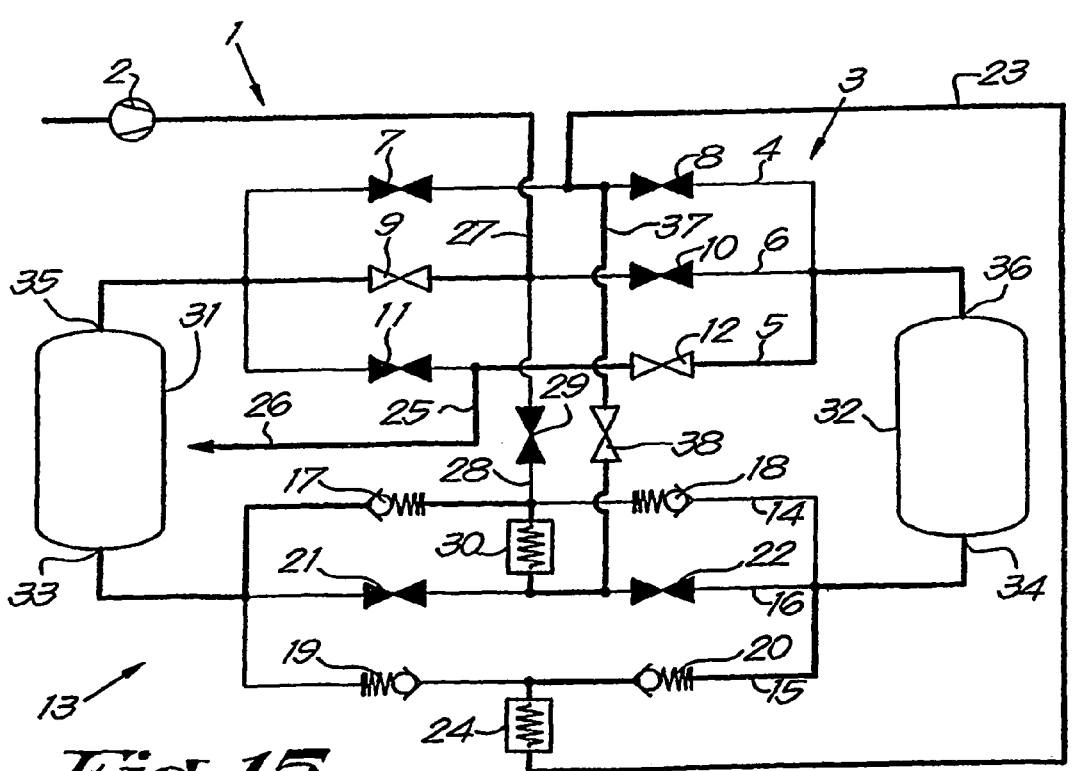

In a first phase, which is represented in FIG. 15, the hot compressed gas is first guided via the valve 9 through the regenerating pressure vessel 31, after which the damp gas is guided via the non-return valve 17, the cooler 30 and the valve 38 through the branch 23 and the cooler 24 to subsequently flow through the non-return valve 20 to the drying pressure vessel 32 where it is dried.

The dried compressed gas is finally carried via the valve 12 and the branch 25 to the above-mentioned take-off point 26 for compressed gas consumers.

Consequently, the coolers 30 and 24 are connected in series in this case, as a result of which the cooling capacity is increased and as a result of which the gas can be dried more efficiently. This results in a lower dew point of the compressed gas at the take-off point of the dryer.

Figure 16:
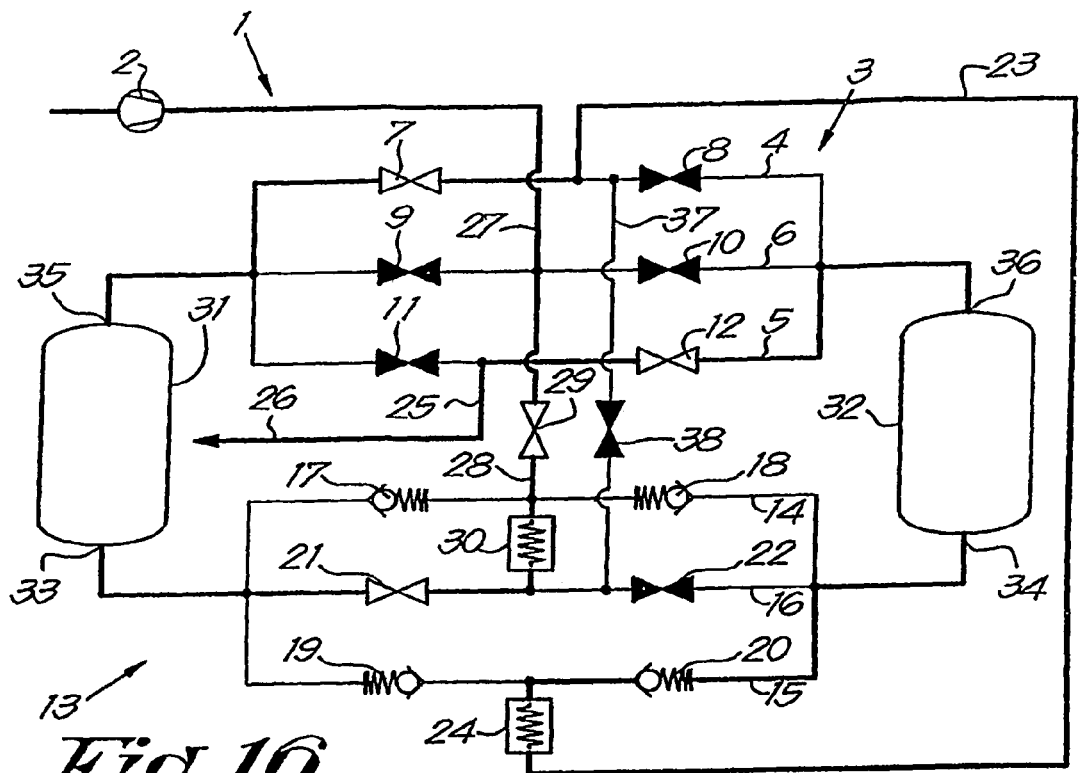

During the second phase, which is represented in FIG. 16, the gas flows through the device 1 in an identical manner as during the second phase of the device, as is represented in FIG. 3, whereby the regenerating pressure vessel 31 is cooled.

Figure 17:
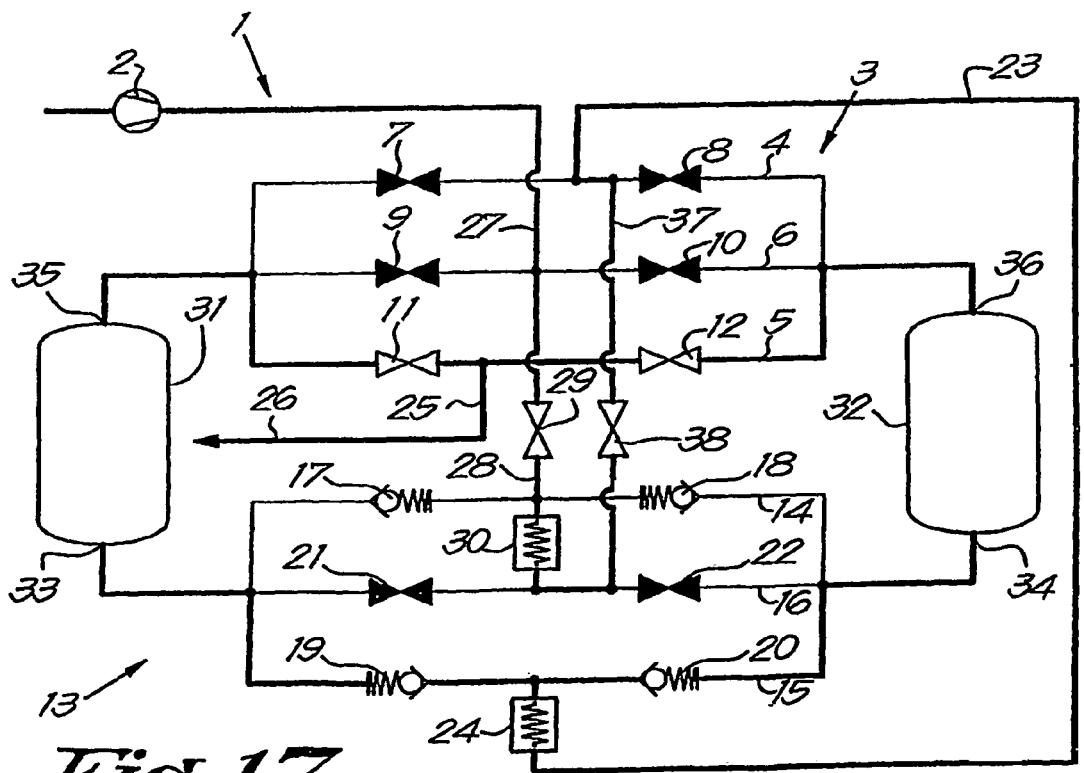
Figure 18:
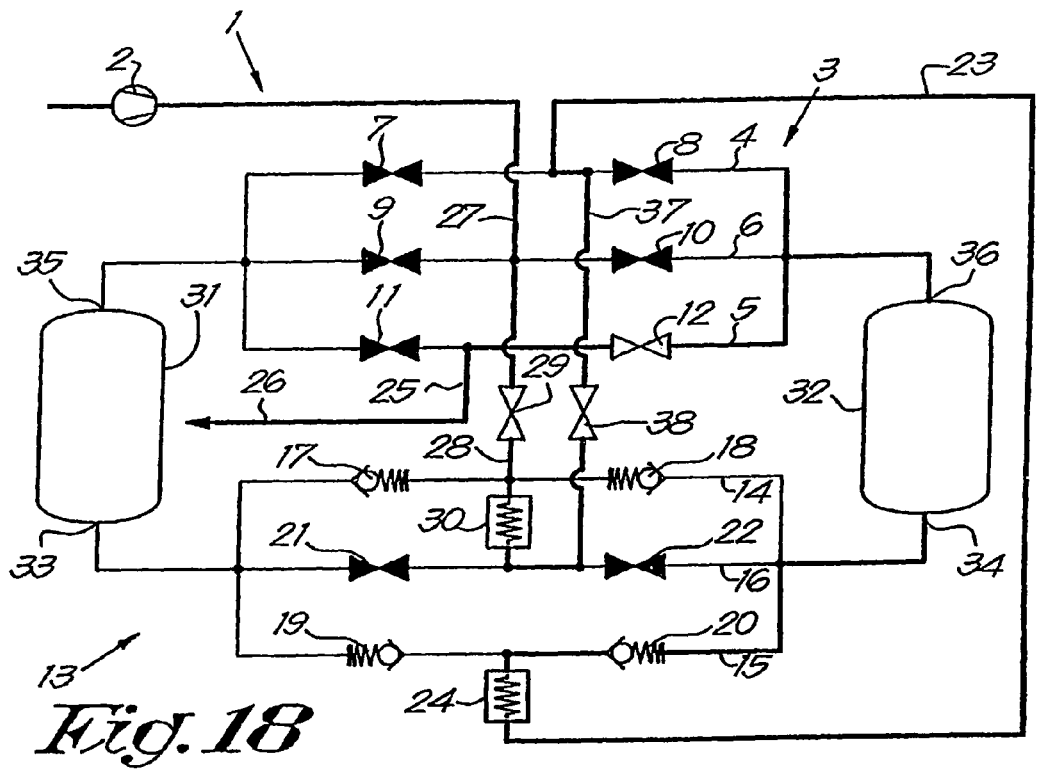

During the third and the fourth phase, which are represented in FIGS. 17 and 18 respectively, the above-mentioned coolers 30 and 24 are each time connected in series by opening the valve 38 and closing the valve 22.

In the third phase, after flowing through the coolers 30 and 24, the gas is split up via the non-return valves 19 and 20 in the pipe 15 to the regenerating pressure vessel 31 on the one hand and the drying pressure vessel 32 on the other hand.

Next, these split gas flows come together again via the valves 11 and 12 in the branch 25 so as to be guided to the take-off point 26.

During the fourth phase, the entire compressed gas flow, cooled by the coolers 30 and 24, is sent through the drying pressure vessel 32, after which it flows via the branch 25 to the take-off point 26.

By analogy with the preceding embodiments, the drying pressure vessel 31 is afterwards changed over to the regenerating pressure vessel 32.

It should be noted that, in this embodiment of the device 1, both available coolers 30 and 24 can be used in any phase of the drying process, and thus, in every phase, the compressed gas is maximally cooled before flowing into the drying pressure vessel 31, which results in a minimal dew point of the gas at the take-off point 26.

Figure 19:
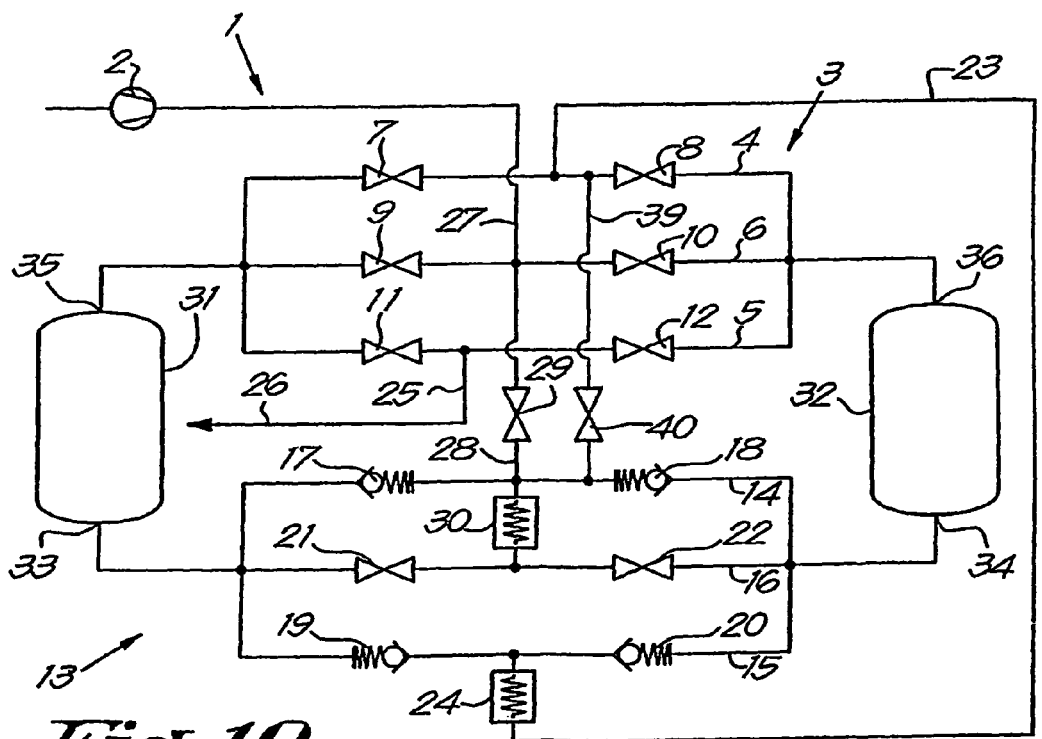

FIG. 19 represents another variant of a device 1 according to FIG. 1 whereby, in this case, a connecting line 39 is provided between the valves 7 and 8 which can be cut off in the pipe 4 and between the non-return valves 17 and 18 in the pipe 14, in which is provided a valve 40 which can be cut off.

The working of such a variant is analogous to that of the preceding embodiment, whereby in this case however, in the first, third and fourth phase, the coolers 30 and 24 are connected in parallel, as a result of which the cooling capacity will be considerably higher than with a single cooler, and the gas can be dried better.

Moreover, by connecting the coolers 30 and 24 in parallel, the pressure drop over these coolers 30 and 24 will be lower than when these coolers 30 and 24 are connected in series.

Figure 20:
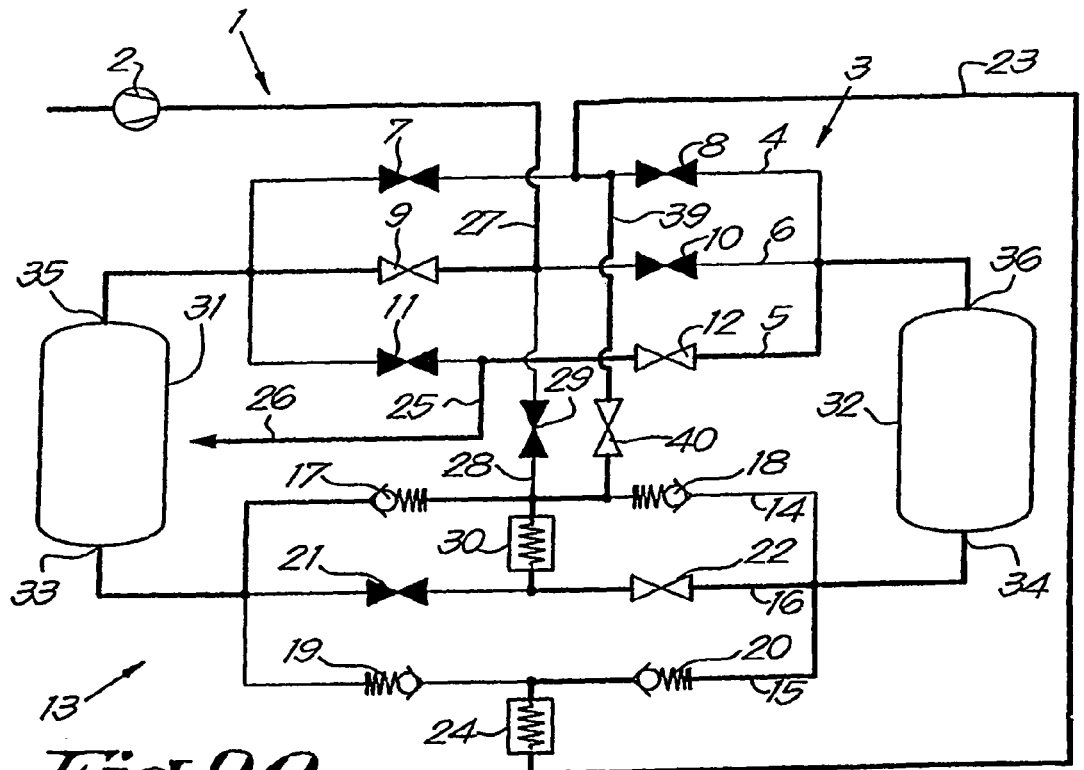
Figure 21:
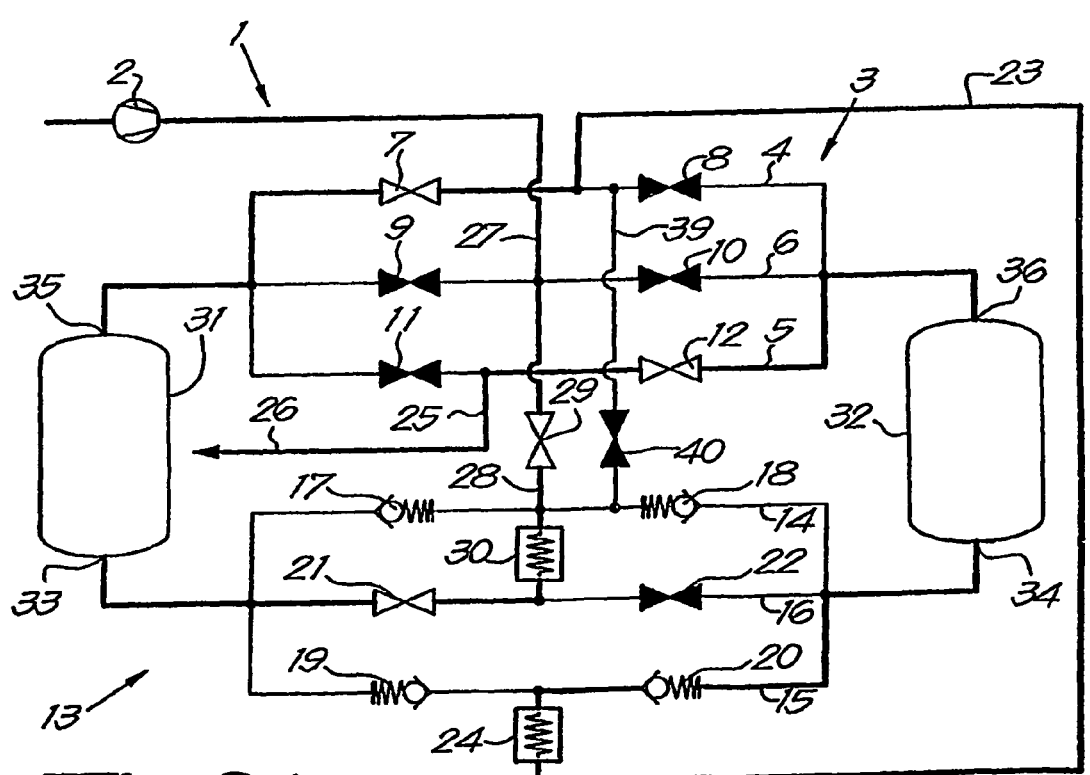
Figure 22:
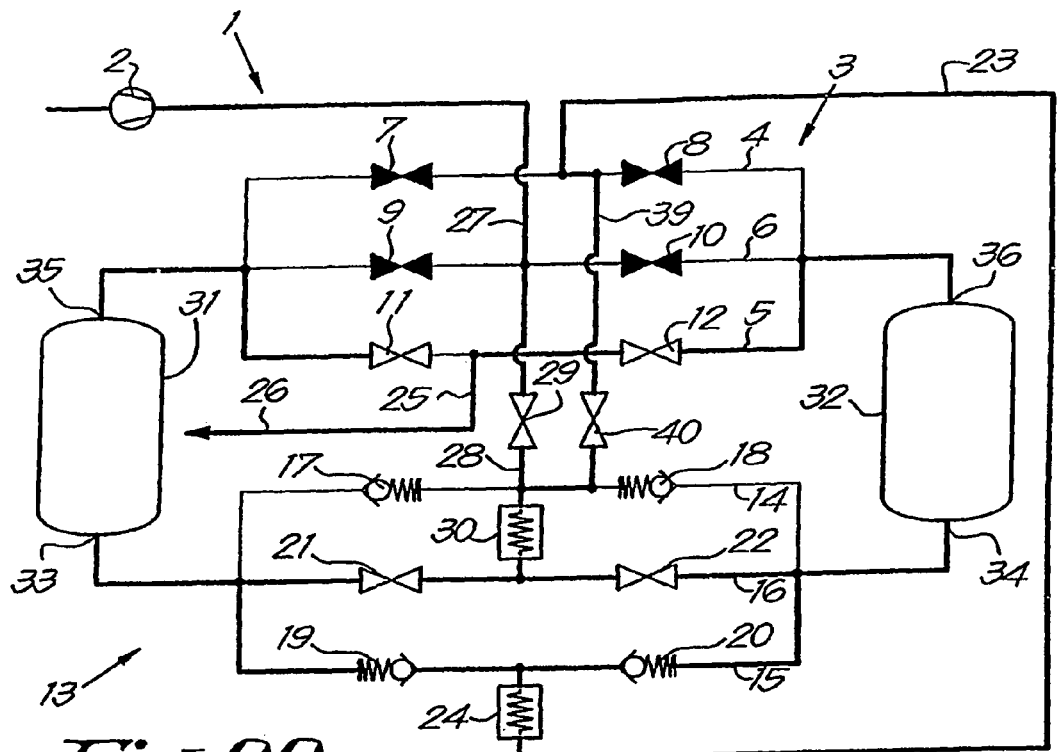
Figure 23:
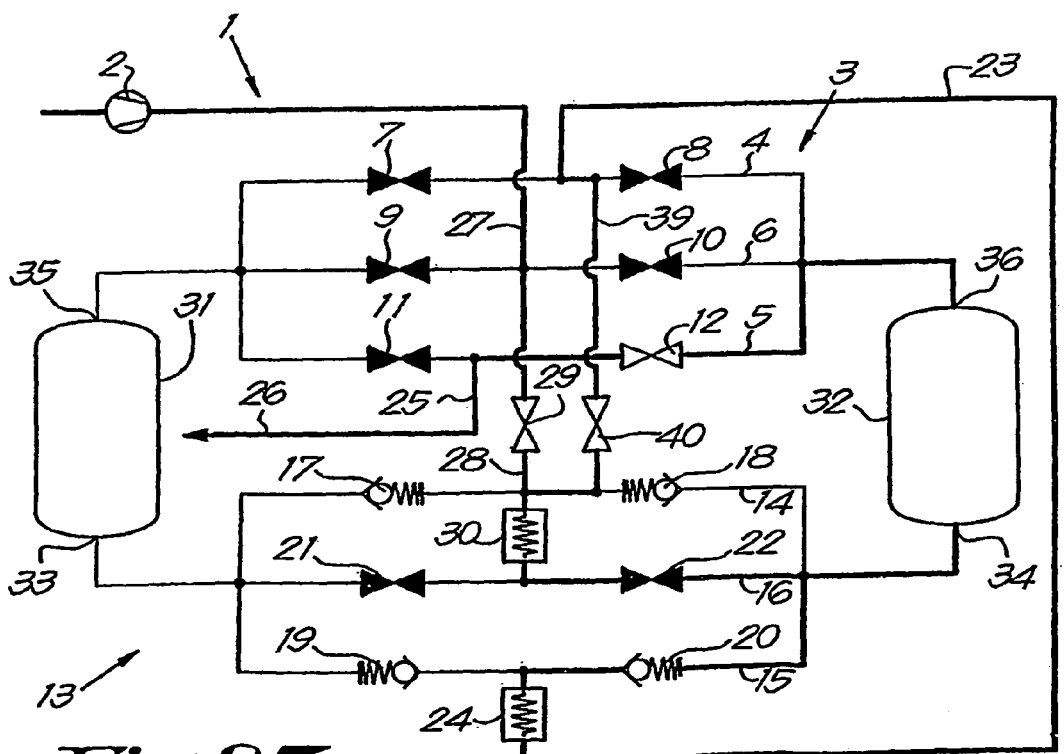

The coolers 30 and 24 are connected in series, as is represented in FIGS. 20, 22 and 23, by opening the valves 40 and 22 which can be cut off.

Figure 24:
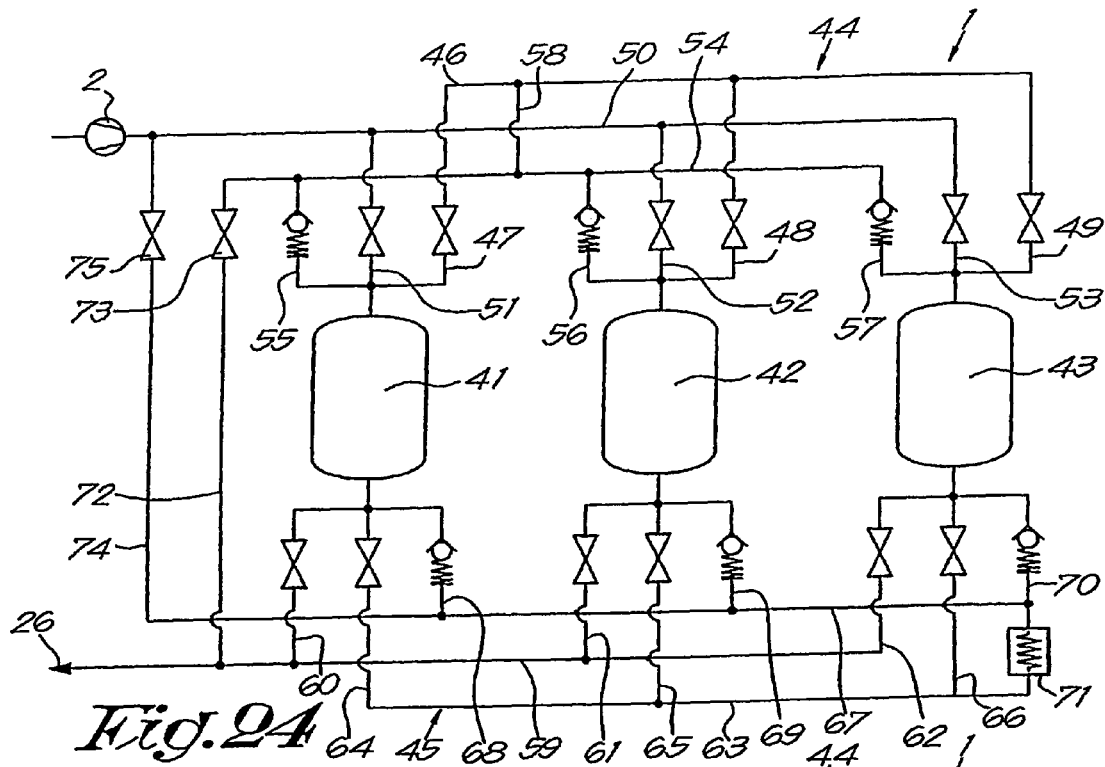
Figure 25:
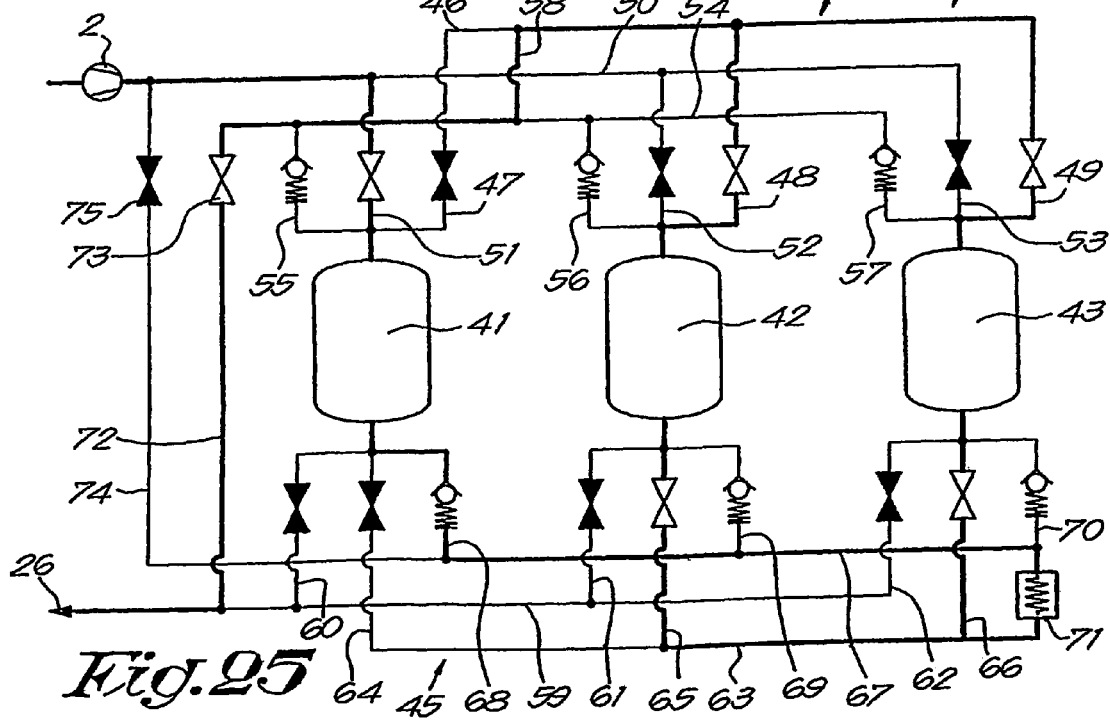

FIG. 24 represents yet another embodiment of a device according to FIG. 1, whereby three pressure vessels 41, 42 and 43 are provided which are connected to a first distribution device 44 with their outputs and to a second distribution device 45 with their inputs.

The above-mentioned first distribution device 44 in this case consists of three main pipes, namely a first 30 main pipe 46 onto which are connected three branches 47 to 49; a second main pipe 50 with branches 51 to 53; and a third main pipe 54 with branches 55 to 57.

Each of the above-mentioned branches 47 to 49, 51 to 53 and 55 to 57 is connected to the output of a respective pressure vessel 41, 42 and 43.

In the branches 47 to 49 and 51 to 53 is each time provided a cut-off valve, whereas in each of the branches 55 to 57 is provided a non-return valve which is positioned such that it allows for a flow to the respective pressure vessel 41, 42, 43 with which the branch 55 to 57 concerned is connected.

The main pipes 46 and 54 are connected to each other by means of a bypass 58, and the above-mentioned supply 2 for compressed gas is directly connected to the main pipe 50.

The second distribution device 45 is built in practically the same manner as the first distribution device 44, and it is also provided with three main pipes, a first main pipe 59 with three branches 60 to 62; a second main pipe 63 with branches 64 to 66; and a third main pipe 67 with branches 68 to 70 respectively.

Each of the above-mentioned branches 60 to 62, 64 to 66 and 68 tot 70 is connected to the input of a respective pressure vessel 41, 42 and 43.

In the branches 60 to 62 and 64 to 66 is each time provided a cut-off valve, whereas in each of the branches 68 to 70 is provided a non-return valve which is positioned such that it allows for a flow from the respective pressure vessels 41, 42, 43 with which the branches 68 to 70 concerned are connected.

The main pipes 63 and 67 of the second distribution device 45 are connected to each other via a cooler 71.

The above-mentioned main pipe 54 is connected to the main pipe 59 and to the take-off point 26 for compressed gas consumers by means of a first connecting line 72 having a valve 73 which can be cut off provided in it.

The above-mentioned main pipe 50 is connected to the main pipe 67 by means of a second connecting line 74, in which is provided a valve 75 which can be cut off.

The working of a device 1 according to FIG. 24 is represented step by step in FIGS. 25 to 28.

In a first phase, the first pressure vessel 41 is regenerated, whereas the second and third pressure vessels 42 and 43 both form drying pressure vessels.

The hot compressed gas is in this first phase directed via the branch 51 through the pressure vessel 41, where the hot gas absorbs moisture from the desiccant, as a result of which this pressure vessel 41 is regenerated.

Next, the damp, compressed gas flows via a non-return valve in the branch 68 to the cooler 71, after which the cooled gas flows through the valves in the branches 65 and 66 to the pressure vessels 42 and 43 to be dried.

The dried compressed gas is then directed through the valves in the branches 48 and 49 and via the main pipe 46 to the bypass 58 and afterwards, via the connecting line 72, to the take-off point 26.

Figure 26:
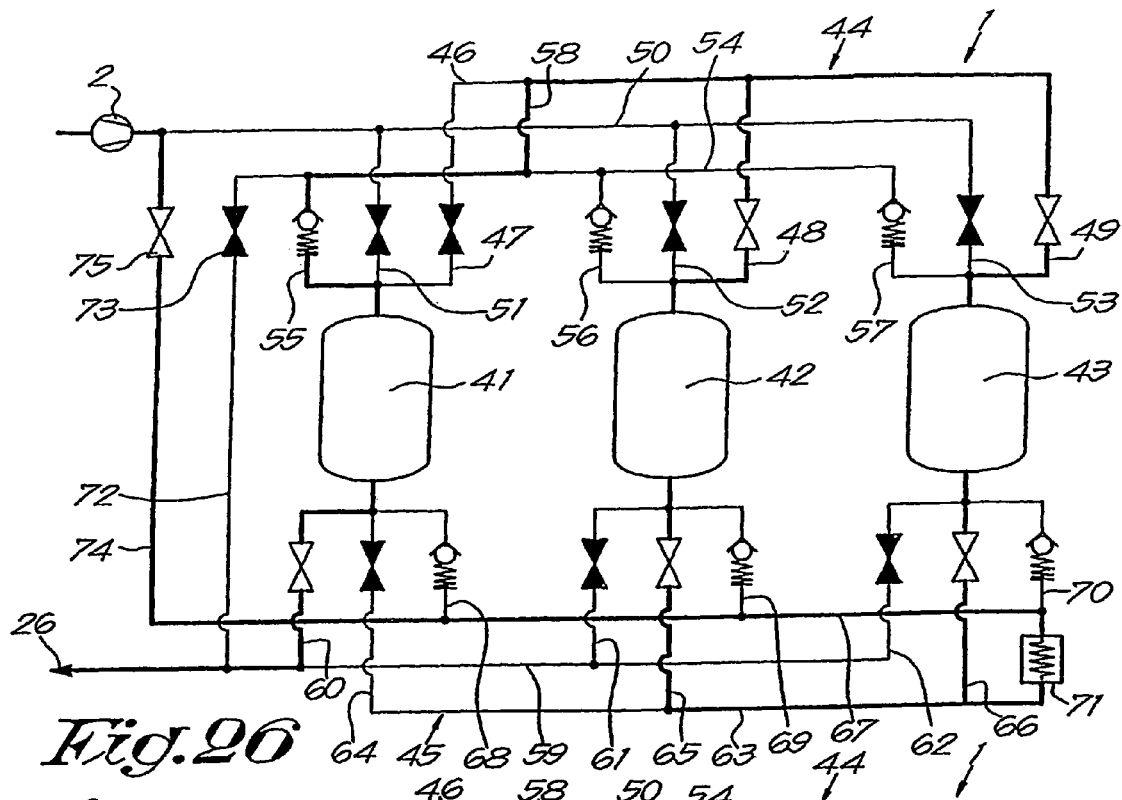

In the second phase, which is represented in FIG. 26, the hot compressed gas, coming from the supply 2, is first directed via the connecting line 74 and the main pipe 67 through the cooler 71 to subsequently flow via the branches 65 and 66 to the pressure vessels 42 and 43 so as to be dried there.

The dried compressed gas is then directed via the branches 48 and 49 and via the bypass 58 through the non-return valve in the branch 55 into the first pressure vessel 41 which is cooled by the gas.

Finally, the gas flow is directed via the branch 60 to the take-off point 26.

Figure 27:
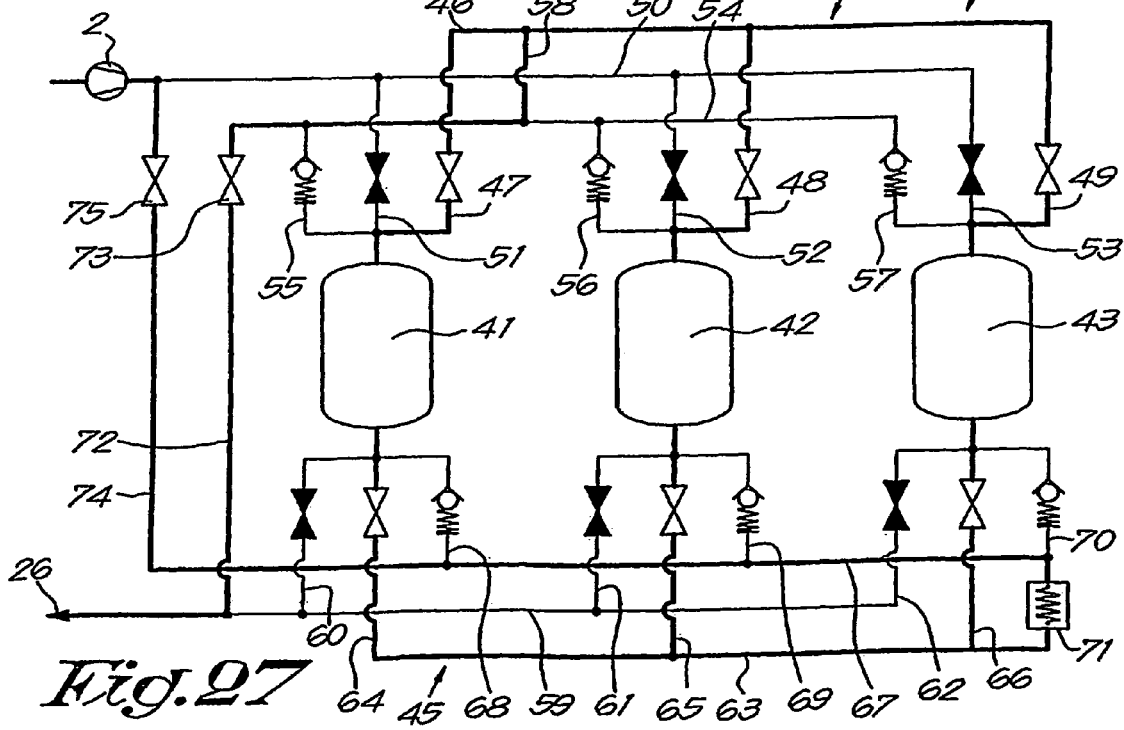

In the third phase, which is represented in FIG. 27, the hot compressed gas is first directed via the connecting line 74 and the main pipe 67 through the cooler 71 to be subsequently split and be directed via each of the branches 64 to 66 to the respective pressure vessels 41 to 43.

Next, the split gas flows are directed via the branches 47 to 49 to flow together again in the main pipe 46 and to be carried via the bypass 58 and the connecting line 72 to the take-off point 26.

The first pressure vessel 41 is cooled further in this third phase, since the supplied gas is first directed through the cooler 71.

Figure 28:
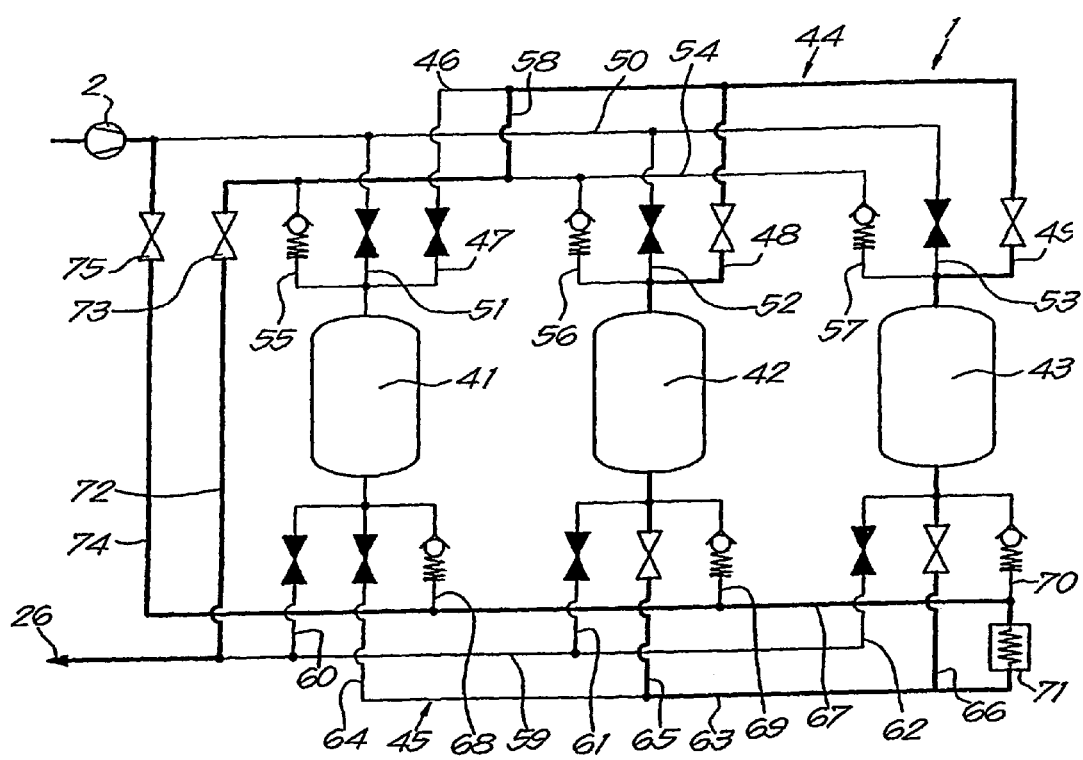

During the fourth and final phase which is represented in FIG. 28, the entire output of compressed gas is directed via the connecting line 74 and the main pipe 67 through the cooler 71.

Next, the gas flows through the cut-off valves in the branches 65 and 66 to the pressure vessels 42 and 43, to then flow via the branches 48 and 49 and the bypass 58 to the connecting line 72 and the take-off point 26.

Such an embodiment of device 1 for drying a compressed gas in a non-dissipative manner with three pressure vessels 41, 42 and 43 has more cut-off valves 20 than the above-described embodiments, but the layout appears to be considerably simpler than the existing ones with three pressure vessels, such that this device 1 can be realised in a relatively cheap manner.

It is clear that in all the embodiments of a device 1 according to the invention, the cut-off valves may be electrically controllable, but they can also be controlled in other ways, such as for example in a pneumatic manner or the like, or they can even be manually controllable.

The present invention is by no means limited to the embodiments described as an example and represented in the accompanying drawings; on the contrary, such a device 1 according to the invention for drying a compressed gas in a non-dissipative manner can be made in all sorts of shapes and dimensions while still remaining within the scope of the invention.

The invention claimed is:

1. Device for drying a compressed gas in a non-dissipative manner, comprising a compressed gas supply (2), two pressure vessels (31,32) with an input (33,34) and an output (35,36), and a take-off point (26) for compressed gas consumers, a first distribution device (3) onto which said compressed gas supply (2) and the take-off point (26) are connected and which is also connected to each of the respective outputs (35 and 36) of the pressure vessels (31 and 32), the said first and second, distribution devices (3 and 13) being connected to each other, and further comprising nine or ten cut-off valves (7-12, 21, 22, 29, 38 and 40); wherein said first distribution device (3) comprises three parallel connected pipes (4, 5 and 6) in which are provided for each pipe two cut-off valves (7,8; 9,10; 11,12) and onto which, for each pipe is connected, between two cut-off valves (7,8; 9,10; 11,12), a branch, namely a first pipe (4) with a first branch (23) which provides a connection to the second distribution device (13), a second pipe (5) with a second branch (25) which is connected to the take-off point (26) for a compressed gas consumer; and a third pipe (6) with a third branch (27) serving as a connection to the compressed gas supply (2) and a fourth branch (28) which is connected to the second distribution device (13) via a cut-off valve (29) and further wherein said second distribution device (13) comprises three parallel connected pipes (14,15 and 16), including a first pipe (14) and a second pipe (15) in which are provided two non-return valves (17,18 and 19, 20) with an opposite flow direction and a third pipe (16) with two cut-off valves (21 and 22) therein, said first pipe (14) and second pipe (15) respectively being each connected between the two non-return valves (17,18 and 19, 20) to said fourth branch (28) and the first branch (23) of the first distribution device (3) respectively, and wherein the first and the third pipe (14 and 16) of the second distribution device (13) are mutually connected via a cooler (30) between the non-return and cut-off valves (17,18 and 21, 22).

2. Device according to claim 1, wherein the first and second distribution devices (3 and 13) comprises either or both symmetrically and modular constructions.

3. Device according to claim 1, wherein said non-return valves (17 and 18) in the first pipe (14) of the second distribution device (13) are positioned such that they enable a flow in the direction of one non-return valve to the other non-return valve in the pipe (14) concerned, and said non-return valves (19 and 20) in the second pipe (15) of the second distribution device (13) are positioned such that they enable a flow in the direction away from the other non-return valve in the pipe (15) concerned.

4. Device according to claim 1, wherein in the first branch (23) there is provided an additional cooler (24).

5. Device according to claim 1, wherein between the cut-off valves (7 and 8) in the first pipe (4) of the first distribution device (3) and between the cut-off valves (21 and 22) in the third pipe (16) of the second distribution device (13), there is provided a connecting line (37) in which is provided a cut-off valve (38).

6. Device according to claim 1, wherein between the cut-off valves (7 and 8) in the first pipe (4) of the first distribution device (3) and between the non-return valves (17 and 18) in the first pipe (14) of the second distribution device (13) there is provided a connecting line (39) in which is provided a cut-off valve (40).

7. Device according to claim 1, wherein one or several of the cut-off valves (7-12, 21, 22, 29, 38 and 40) are configured as a controlled valve which is connected to a control system.

8. Device according to claim 1, wherein the cut-off valves (7-12, 21, 22, 29, 38 and 40) are configured as two-way valves.

9. Device according to claim 1, wherein said first and second distribution devices (3 and 13) have substantially the same dimensions.

10. Device according to claim 1, wherein said first and second distribution devices (3 and 13) are configured as tubular constructions which are identical in shape and which are provided concentrically one above the other.

11. Device according to claim 10, wherein the tubular construction has standard dimensions, so as to enable it to be combined with pressure vessels (31 and 32) having a different volume and for devices (1) having a different capacity.

* * * * *